United States Patent
Vågstedt

(12) 
(10) Patent No.: US 6,378,957 B1
(45) Date of Patent: Apr. 30, 2002

(54) ARRANGEMENT FOR CONTROLLING VEHICLE BRAKING

(75) Inventor: Nils-Gunnar Vågstedt, Täby (SE)

(73) Assignee: Scania CV Aktiebolag (SE)

( * ) Notice: Subject to any disclaimer, the term of this patent is extended or adjusted under 35 U.S.C. 154(b) by 0 days.

(21) Appl. No.: 09/305,806

(22) Filed: Apr. 27, 1999

(30) Foreign Application Priority Data

Apr. 30, 1998 (SE) ................................................ 9801565

(51) Int. Cl.⁷ ................................................ B60T 13/00
(52) U.S. Cl. .................... 303/9.62; 303/113.5; 303/186
(58) Field of Search ................................ 303/9.62, 9.69, 303/186, 190, 113.5

(56) References Cited

U.S. PATENT DOCUMENTS

| | | | |
|---|---|---|---|
| 4,715,665 A | * 12/1987 | Ostwald | 303/187 |
| 4,735,279 A | * 4/1988 | Sato | 303/190 |
| 4,986,609 A | * 1/1991 | Cole et al. | 303/9.69 |
| 5,433,513 A | * 7/1995 | Takayama | 303/186 |
| 5,772,289 A | * 6/1998 | Nakazawa et al. | 303/9.69 |
| 5,938,295 A | * 8/1999 | Stumpe et al. | 303/9.69 |
| 5,975,650 A | * 11/1999 | Meier et al. | 303/186 |

FOREIGN PATENT DOCUMENTS

| | | |
|---|---|---|
| EP | 0078655 | 5/1983 |
| EP | 0318928 | 6/1989 |
| NO | 155746 | 2/1987 |

OTHER PUBLICATIONS

Japanese Abstract of Appln. No. 60–139559 dated Jul. 24, 1985.

* cited by examiner

Primary Examiner—Christopher P. Schwartz
Assistant Examiner—Robert A. Siconolfi
(74) Attorney, Agent, or Firm—Ostrolenk, Faber, Gerb & Soffen, LLP

(57) ABSTRACT

The arrangement relates to an arrangement for a vehicle (1) which incorporates a framework which itself incorporates a front pair of wheels with a braking configuration for each wheel and also a rear pair of wheels with a braking configuration for each wheel. The tractor vehicle is designed to haul a trailer by means of a towing device. There is a detector for the value of a parameter of the rear pair of wheels. A control unit designed to control the braking action of the braking configurations of the front pair of wheels on the basis of the value of the parameter.

15 Claims, 2 Drawing Sheets

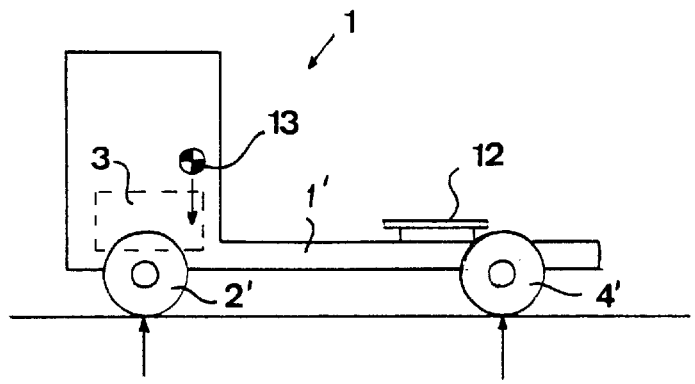
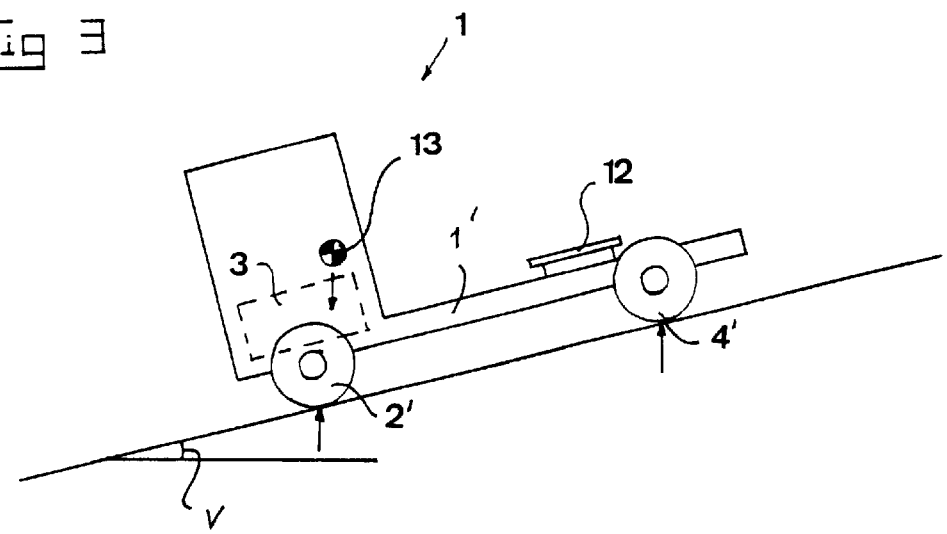

ARRANGEMENT FOR CONTROLLING VEHICLE BRAKING

BACKGROUND OF THE INVENTION, AND STATE OF THE ART

The present invention relates to an arrangement for controlling braking of a vehicle, and particularly to an arrangement which senses a parameter, e.g. speed of or load on the rear wheels, to adjust brake application on the front wheels.

The invention is applicable to motor vehicles, and particularly to tractor vehicles intended to haul a trailer or a semitrailer by means of a so-called fifth wheel or some other towing device permanently mounted on a rear element of a framework of the tractor vehicle. During normal operation, particularly when a trailer is coupled to the tractor vehicle, the braking power of the tractor vehicle on the occasion of retardation is distributed between the front pair of wheels and the rear pair of wheels according to a predetermined fixed braking distribution which is usually such that a somewhat greater braking power is applied to the front pair of wheels than to the rear pair of wheels. Modern tractor vehicles are also often equipped with so-called ABS (Antilock braking system) brakes which, in brief, incorporate sensors designed to detect, and reduce the braking force applied to, any wheel which is tending to lock. These sensors are usually designed to detect the rotation speed of the wheels.

Such tractor vehicles usually have the engine situated in the vicinity of (or, in typical cases, above) the front axle. When such a tractor vehicle is driven forwards without a trailer, its center of gravity will consequently be relatively for forward and high up. In other words, in such situations the load on the front pair of wheels will be substantially greater than the load on the rear pair of wheels. Such a load distribution may give rise to problems due to powerful retardation causing more of the load to be shifted from the rear pair of wheels to the front pair of wheels, which means that the wheels i the rear pair will tend to rise off the ground and hence easily lock, which may impair the steering properties of the vehicle and cause great risk of the tractor vehicle getting into a skid. The problem described is particularly troublesome when the tractor vehicle is being driven downhill, which clearly entails the center of gravity being shifted forwards relative to the front axle of the vehicle.

A known way of solving this problem is to provide such tractor vehicles with a reducing valve, i.e. a constriction, on the brake line containing the medium which transmits the braking force to the brakes of the front wheels. This makes it possible to influence the pressure of the braking medium and hence reduce the braking force applied to the brakes of the front wheels, i.e. the predetermined braking distribution is altered by such a reducing valve so that a larger proportion of the braking power is distributed to the rear pair of wheels.

Such a reducing valve requires, however, a sensor to detect whether a trailer is coupled to the tractor unit, and a control unit to activate the reducing valve if no trailer is coupled to the tractor vehicle and deactivate the reducing valve if a trailer is coupled to the tractor vehicle. Moreover, reducing valves with different constrictions are required for different vehicles, depending on the weight and design of the vehicle. The reducing valve also entails an extra stage in tractor vehicle assembly. The cost of providing a tractor unit with such a reducing valve is therefore not insignificant.

JP09076891-A refers to an arrangement intended for a fork truck and designed to calculate permissible brake pressure by means of a processor. The calculation is based on a number of parameters such as load height, tilt angle, the vehicle's angle of inclination, applied load, the vehicle's acceleration, and incorporates determination of the center of gravity by means of a gravitation detector.

SUMMARY OF THE INVENTION

The object of the present invention is to ensure good braking action on a vehicle irrespective of its load state or of whether the vehicle is hauling a trailer or not. What is particularly aimed at is an arrangement which can at an early stage identify and avert an incipient forward tilting movement of the tractor vehicle.

This object is achieved with the arrangement indicated in the introduction, which is characterised by a control unit designed to control the braking action of the braking configurations of the front pair of wheels in response to the value of said parameter. Such an arrangement makes it possible to adapt the braking action on the front pair of wheels automatically to a critical state of the rear pair of wheels, particularly when the vehicle is not carrying a load and its rear end is of relatively low weight or the vehicle is being driven without a trailer. It is thus possible to prevent risk of the vehicle getting into a skid because the wheels of the rear pair lock or roll as a result of the powerful dynamic load shift forwards due to powerful retardation. This automatic adaptation of the braking action on the front pair of wheels may be simply accomplished by means of technology which is already incorporated in the tractor vehicles now on sale. Said parameter may with advantage be selected for the purpose in such a way as to indicate at least incipient locking of at least one of the wheels of the rear pair. Moreover, the control unit according to a preferred embodiment can be designed to reduce the braking action of the braking configurations of the front pair of wheels if the value of said parameter indicates at least incipient locking of at least one of the wheels of the rear pair.

According to one embodiment of the invention, said parameter pertains to the rotation of the wheels of the rear pair relative to the forward velocity of the vehicle. Such a state whereby the wheels of the rear pair rotate with a substantially lower rotation speed than that corresponding to the forward velocity of the vehicle is an indication that the rear wheels are tending to lock. Said means may therefore with advantage incorporate at least a first sensor designed to detect the rotation of one of the wheels of the rear pair. Said means may also incorporate at least a second sensor designed to detect the rotation of one of the front pair of wheels as a measure of the forward velocity of the vehicle. It should be noted here that said first and second sensors for detection of wheel rotation may also be used for detecting wheel retardation. Thus detection or substantially greater retardation on one of the rear wheels relative to an estimated vehicle retardation may be used as an indication of incipient wheel locking and may initiate reduction of the braking force applied to the front wheels. This technology is now used in many ABS systems for adjusting the braking force applied to a wheel found to be displaying a greater retardation. It should be noted that the invention may also use other means of identifying a need for reduced braking power.

According to another embodiment of the invention, said parameter relates to the load on the rear pair of wheels. A state whereby the load on the wheels of the rear pair is substantially below a normal value is also an indication that the rear wheels are tending to lose contact with the road and therefore lock. A load decrease on the rear wheels may thus be used for initiating a reduction in the braking action on the front wheels. Suitable load-detecting sensors may therefore, for example, be arranged to detect the pressure in pneumatic suspension devices of the tractor vehicle.

According to a further embodiment of the invention, the arrangement incorporates other means designed to detect the braking force applied by the braking configurations of the rear pair of wheels, and the control unit is designed to reduce the braking action of the braking configurations of the front pair of wheels according to the value of said parameter and that of said braking force applied. This makes is possible to cause the reduction in the braking action of the braking configurations of the front pair of wheels to decrease as said braking force applied increases. It is advantageous if the arrangement according to the invention can in this way detect and take into consideration whether the vehicle is in a state of powerful retardation. At the same time, the braking configurations of at least the rear pair of wheels may be activated by means of a braking medium supplied via a brake line, while said other means may with advantage incorporate at least a third sensor designed to detect the pressure of said braking medium.

BRIEF DESCRIPTION OF THE DRAWINGS

The present invention will now be explained by means of various embodiments described as examples with reference to the attached drawings, in which:

FIG. 2 shows schematically a side view of a tractor vehicle on a substantially horizontal surface.

FIG. 3 shows schematically a side view of the tractor vehicle of FIG. 2 on a sloping surface.

DETAILED DESCRIPTION OF VARIOUS EMBODIMENTS OF THE INVENTION

Figure 1:
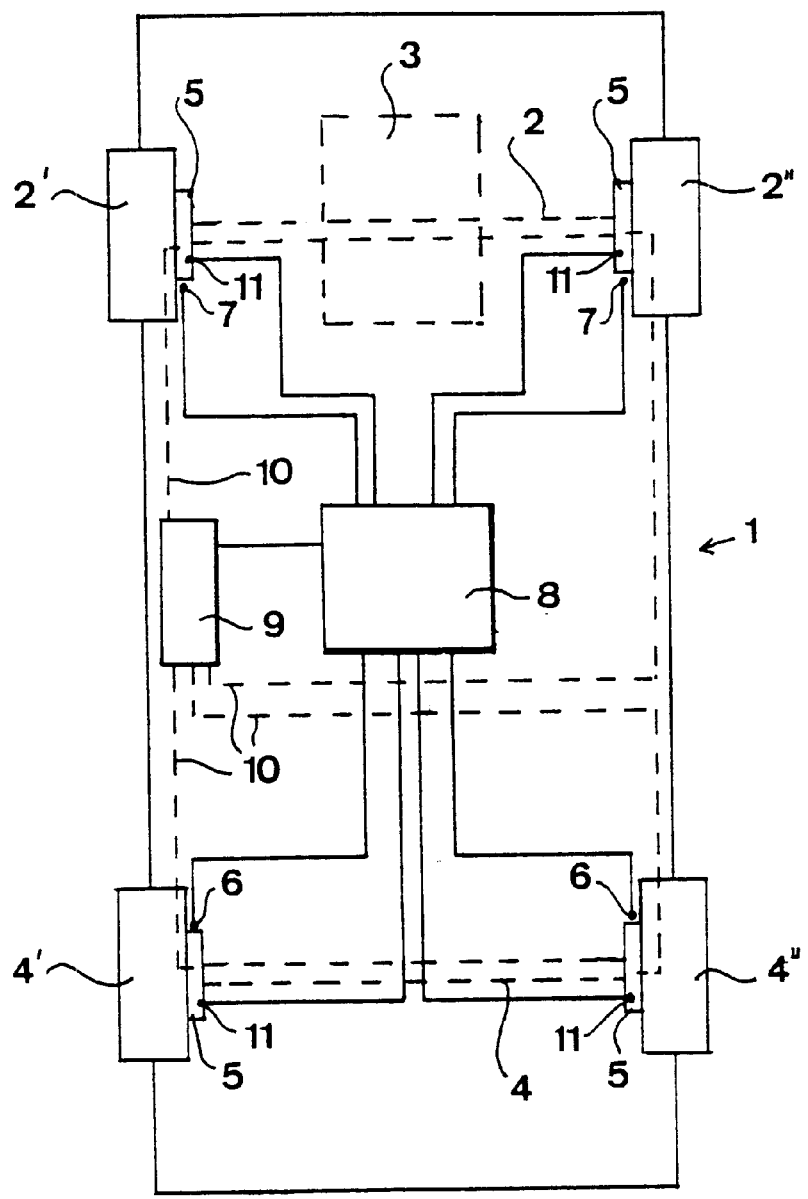
FIG. 1 shows a schematic view from above of a tractor vehicle with an arrangement according to an embodiment of the invention.

FIG. 1 shows schematically a tractor vehicle 1 intended to be driven in the normal forward direction x. The tractor vehicle 1 has a framework 1' (see FIGS. 2 and 3). The framework 1' incorporates a front wheel axle 2 with a first wheel 2' situated on the left side of the vehicle 1 and a second wheel 2" on the right side of the vehicle 1. Above the front wheel axle 2 a schematically depicted engine 3 is arranged for the propulsion of the vehicle 1. The depicted vehicle 1 also incorporates a rear wheel axle 4 with a first wheel 4' on the left side of the vehicle 1 and a second wheel 4" on the right side of the vehicle 1. Each wheel has associated with it a braking configuration 5 in the form of a wheel brake. It should be noted that the braking configuration 5 may incorporate not only a wheel brake but also other types of speed reducing devices, e.g. an exhaust brake, a retarder, the engine brake of the vehicle 1, etc.

The vehicle 1 further incorporates a detection device in the form of a first sensor 6 on each of the rear wheels 4', 4" and a second sensor 7 on each of the front wheels 2' and 2". The sensors 6, 7 are designed to detect the rotation speed or the peripheral speed of the rear wheels 4', 4" and the front wheels 2', 2" respectively. The vehicle 1 further incorporates a schematically depicted control unit 8 to which the sensors 6, 7 are connected. The control unit 8 is further connected to each of the braking configurations 5 in order to control the braking power which is to be applied to each of the wheels 2', 2", 4', 4".

According to the invention, the control unit 8 is designed to influence the braking force applied to the front wheels 2' and 2" on the basis of the rotation detected of the rear wheels 4' and 4" and, more specifically, in such a way that the control unit 8 reduces the braking action of the braking configurations 5 of the front wheels 2' and 2" if the rear wheels 4' and 4" are tending to lock.

Such incipient locking of the rear wheels 4' and 4" can be calculated by means of the control unit 8 if the rotation speed detected of the rear wheels 4' and 4" is substantially lower than the rotation speed detected of the front wheels 2' and 2", which rotation speed provides a measure of the forward velocity of the vehicle 1. It should in this respect be noted that it is also possible for the forward velocity of the vehicle 1 to be detected in other ways than as here proposed.

The vehicle 1 further incorporates a conventional system 4 providing necessary braking force. This system incorporates an arrangement 9 for providing a pressurised medium, and brake lines 10 which extend to each of the braking configurations 5. According to the invention, pressure sensors 11 are arranged to detect the pressure of the braking medium at the respective braking configurations 5.

The control unit 8 is also designed to detect the braking force being applied to the braking configurations 5 of the rear wheels 4', 4" and the front wheels 2', 2". The control unit 8 further incorporates the normal ABS function, i.e. the control unit 8 is designed to reduce the braking action on whichever one or more of the wheels 2', 2", 4', 4" on which incipient locking is observable by means of the respective sensors 6, 7.

According to the present invention, the control unit 8 is further designed so that the braking action of the braking configurations 5 of the front pair of wheels 2', 2" is controlled not only in response to incipient locking of the rear pair of wheels 4', 4" but also with regard to the total braking force applied, so that the reduction in the braking action of the braking configurations 5 of the front wheels 2', 2" decreases when the braking force applied increases. This means that if the vehicle 1 is in the state of powerful retardation, the conventional control system for the ABS function will be coordinated with the control according to the invention of the braking force applied.

FIG. 2 shows a tractor vehicle 1 designed, in normal operation, to haul a trailer or semitrailer (not depicted) by means of a so-called fifth wheel 12. When the vehicle 1 is driven forwards without any such trailer, the center of gravity 13 of the vehicle 1 will be relatively far forward and relatively high up. Exactly where the center of gravity is depends on the type of vehicle, how high the driving cab is, how large an engine the vehicle 1 has, the distance between the wheel axles etc. This means that when the vehicle 1 is driven forwards without a trailer, only between about 10 and 30% of the weight of the vehicle 1 will be supported by the rear pair of wheels 4', 4". Braking the vehicle 1 alters this ratio so that a still smaller proportion of the weight of the vehicle 1 is supported by the rear wheels 4', 4", entailing a very great risk of the rear wheels 4', 4" locking even at relatively slight retardation. Locking of the rear wheels 4', 4" will substantially alter the steering properties of the vehicle 1, which may therefore get into a critical state such as a skid situation.

FIG. 3 shows the vehicle of FIG. 2 being driven forwards down a slope with the gradient v. This situation accentuates still further the problem described and may even cause risk of the vehicle 1 tilting forwards on the occasion of retardation.

The present invention is not limited to the embodiments referred to but may be varied and modified within the scope of the patent claims set out below. For example, it should be noted that it is also possible, instead of detecting the rotation of the rear wheels 4', 4", to detect the load acting on the rear wheels 4', 4". When this load is below a certain value, there is very great risk that the braking force applied may cause locking of the rear wheels 4', 4".

The invention is applicable not only to tractor vehicles but also to other types of motor vehicle, especially relatively short trucks. When such trucks are driven forwards with little or no load, the rear end will be substantially lighter than in full load situations, thereby possibly giving rise to the problems referred to in the introduction.

What is claimed is:

1. An arrangement for braking the front wheels of a vehicle based on a detected parameter, wherein the vehicle includes a framework, a front pair of wheels on the framework and a rear pair of wheels on the framework behind the front pair of wheels;

the arrangement comprising:

a respective brake configuration for each wheel;

a detector for initially detecting a value of a parameter of the rear pair of wheels capable of indicating at least incipient locking of at least one of the wheels of the rear pair of wheels; and a control unit for receiving the detected value of the parameter and for controlling the braking action of the brake configurations of the front pair of wheels during deceleration of all four wheels in response to the detected value of the parameter, wherein the control unit is operable to reduce the braking action of the brake configurations of the front pair of wheels if the value of the detected parameter indicates at least incipient locking of at least one of the wheels of the rear pair of wheels.

2. The arrangement of claim 1, wherein the parameter detected relates the detected rotation of the wheels of the rear pair of wheels to the detected forward velocity of the vehicle.

3. The arrangement of claim 1, wherein the detector comprises at least a first sensor for detecting the rotation of one of the wheels of the rear pair.

4. The arrangement of claim 3, wherein the detector comprises at least a second sensor for detecting the rotation of one of the wheels of the front pair as a measure of the forward velocity of the vehicle so that the control unit operates based on the rotation detected by the first sensor of the at least one wheel of the rear pair of wheels and the rotation detected by the second sensor of at least one wheel of the front pair of wheels.

5. The arrangement of claim 1, wherein the parameter detected concerns the load on the rear pair of wheels.

6. The arrangement of claim 1, further comprising another detector for detecting the braking force applied by the brake configurations of the rear pair of wheels, and the control unit is operable to control the braking action of the brake configurations of the front pair of wheels based on the value of the parameter and based upon the braking force applied.

7. The arrangement of claim 6, further comprising a brake line for supplying a braking medium to at least the rear pair of wheels for activating the brake configurations for the rear pair of wheels, and the second detector comprising a third sensor designed to detect the pressure of the braking medium.

8. The arrangement of claim 1, wherein the vehicle is a tractor vehicle including a towing device for towing a trailer.

9. The arrangement of claim 1, wherein the parameter capable of indicating at least incipient locking of at least one of the wheels of the rear pair of wheels indicates at least one of: the wheels of the rear pair are rotating with a substantially lower rotation speed than that corresponding to the forward velocity of the vehicle; a substantially greater deceleration of one of the rear wheels relative to an estimated vehicle deceleration; a load on the rear pair of wheels that is substantially below a normal vehicle for the vehicle; and an increasing braking force applied to the rear wheels.

10. A method for controlling the braking of the front wheels of a vehicle for preventing a vehicle wheel from locking, wherein the vehicle comprises a framework with a front pair of wheels, a brake configuration for each of the wheels of the front pair, a rear pair of wheels and a brake configuration for each of the rear pair of wheels, the method comprising the steps of:

operating the brake configurations and decreasing the speed of all four wheels;

subsequently detecting a parameter of the rear pair of wheels wherein the parameter indicates at least incipient locking of at least one of the wheels of the rear pair of wheels, and controlling the braking action of the brake configurations of the front pair of wheels by reducing the braking action of the brake configurations of the front pair of wheels if the value of the detected parameter indicates at least incipient locking of at least one of the wheels of the rear pair of wheels.

11. The method of claim 10, wherein the parameter measured is the rotation rate of the wheels of the rear pair of wheels relative to the forward velocity of the vehicle.

12. The method of claim 10, wherein the parameter measured relates to the load on the rear pair of wheels and activates the control unit to prevent incipient locking of at least one of the wheels of the rear pair when the load on the rear pair of wheels decreases below a determined level.

13. The method of claim 10, wherein the parameter of the rear pair of wheels that indicates at least incipient locking of at least one of the wheels of the rear pair of wheels indicates at least one of: the wheels of the rear pair are rotating with a substantially lower rotation speed than that corresponding to the forward velocity of the vehicle; a substantially greater deceleration of one of the rear wheels relative to an estimated vehicle deceleration; a load on the rear pair of wheels that is substantially below a normal value for the vehicle; and an increasing braking force applied to the rear wheels.

14. An arrangement for averting incipient forward tilting motion of a tractor vehicle intended to haul a trailer or a semitrailer by means of a towing device mounted on a rear element of a framework of a tractor vehicle, wherein the vehicle includes a front pair of wheels on a front axle on the framework and a rear pair of wheels on the framework behind the front pair of wheels, and an engine situated in the vicinity or above the front axle resulting in the load on the front pair of wheels being substantially greater than the load on the rear pair of wheels, the arrangement comprising:

a respective brake configuration for each wheel;

a detector for detecting a value of a parameter of the rear pair of wheels; and a control unit for receiving the detected value of the parameter and for controlling the braking action of the brake configuration of the front pair of wheels in response to the value of the parameter, wherein the control unit is operable during deceleration of all four wheels to reduce the braking action of the brake configurations of the front pair of wheels if the value of the detected parameter indicates that the rear pair of wheels tends to rise off the ground.

15. The arrangement of claim 14, wherein the control unit is operable to reduce the braking action of the brake configuration of the front pair of wheels if the value of the detected parameter indicates at least incipient locking of at least one of the wheels of the rear pair of wheels.

\* \* \* \* \*